UNITED STATES PATENT OFFICE.

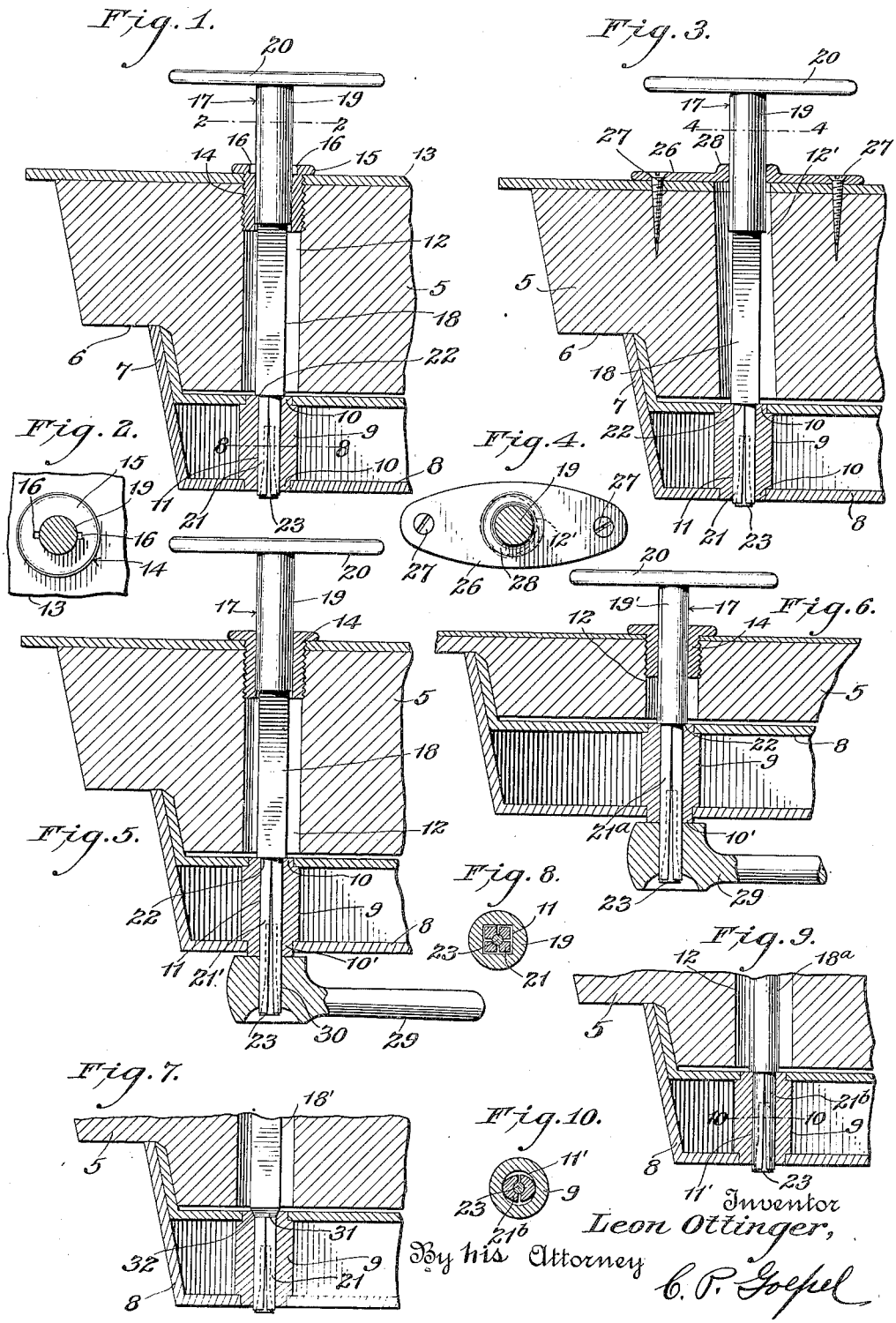

LEON OTTINGER, OF NEW YORK, N. Y.

HANDLE-ATTACHING MEANS FOR DOOR LATCHES.

1,411,581.  Specification of Letters Patent.  Patented Apr. 4, 1922.

Application filed September 3, 1920, Serial No. 408,057. Renewed February 23, 1922. Serial No. 538,698.

*To all whom it may concern:*

Be it known that I, LEON OTTINGER, a citizen of the United States, and resident of the city of New York, in the county and State of New York, have invented certain new and useful Improvements in Handle-Attaching Means for Door Latches, of which the following is a description.

This invention relates to a vehicle door latch, and more particularly concerns certain improvements in the means for mounting and attaching an operating handle to the roll back, or equivalent actuating element of a latch mechanism such as that disclosed in my prior application for patent, filed February 5, 1920, Serial No. 356,573, and for which this application is a substitute.

In its generic aspect my present improvement contemplates the provision of simple and effective means for securing an absolutely tight and rigid connection of one end of a shaft in a bore provided in an associated part so that said part and the shaft become for all practical purposes, substantially a unitary structure.

In the application to which I have just referred, I have illustrated a handle shaft extending through a passage or opening in the door which is in alignment with the bore or opening through the roll back, and outer end of this handle shaft being provided with an enlarged portion abutting at one of its ends against an inturned flange on the inner end of a bearing bushing which is threaded or otherwise fixed in the end of the passage through the door. The handle shaft at its other end is split and adapted for engagement in the bore of the roll back, suitable means being provided to expand the end of the shaft and thereby secure a tight binding engagement of the same with the walls of the bore.

While this device has proven to be very satisfactory in practical use, insofar as its functional operation is concerned, it has been found that more or less frequently the doors are inaccurately made and are not of an exact predetermined thickness, or that the mortise which receives the latch casing is not of exactly the required depth. In such instances, when the split end of the handle shaft is secured in the roll back, the outer enlarged end of the shaft will be slightly spaced from the shoulder or flange on the bushing. It will be understood that the length of the intermediate portion of the handle shaft from the enlarged end thereof to the split portion is definitely predetermined in accordance with the distance between the shoulder on the bushing and the end of the roll back when the latch is fitted to the door in order to insure a close fit of the handle shaft against the shoulder. Therefore, when such inaccuracies in the door structure, as I have above referred to, exist resulting in a spacing of the enlarged end of the shaft from the shoulder, an accidental inward pressure on the outer end of the shaft tends to force the split end thereof longitudinally through the roll back, resulting in a loosening of the connection and consequent lost motion which produces a rattling of the shaft end in the roll back.

It is, therefore, the primary object and purpose of the present improvement to provide simple and effective means for preventing this possible loosening and rattling. Secondly, in those cases where the opening through the door is not accurately bored by the manufacturer, and, therefore, does not axially align with the opening in the roll back when the latch is applied, the bearing bushing above referred to cannot be used. In such cases I propose to loosely engage an escutcheon plate upon the outer end of the handle shaft, the bushing above referred to being dispensed with. The inner end of the shaft is then fitted into the bore of the roll back and tightly secured, and finally the escutcheon plate is moved inwardly on the outer end of the shaft and fitted to the outer face of the door so as to conceal the shaft receiving passage in the door.

More particularly the present improvement consists in the provision, at the inner end of the expansible end portion of the handle shaft, of a shoulder or other suitable abutment means to engage against the end of the roll back which is opposed to the passage through the door, and thus act as a stop to positively limit the movement of the split end of the shaft through the bore of the roll back. This shoulder or abutment obviates any possible lateral oscillation of the shaft relative to the roll back, and the roll back itself constitutes a bearing or support for the inner end of the handle shaft, the bushing in the one case, or the escutcheon plate in the other constituting a stop against lateral deflection by positive pressure against the outer end of the handle.

In an alternative embodiment of the invention designed for application to the doors of motor vehicles having closed bodies, or to the door of a touring car I propose to provide the handle shaft with a relatively long expansible end portion so that the same projects beyond the end of the roll back, which end of the roll back, in turn, slightly projects beyond the inner side of the latch casing. Upon this projecting end portion of the expansible shaft section an inner handle member is engaged. The expanding means is then operated so as to tightly bind the expansible shaft section simultaneously against the wall of the bore through the roll back, and with the inner handle member, whereby the latter is tightly secured against the projecting end of the roll back and the shoulder or abutment of the handle shaft is tightly held against the opposite end of the roll back.

With the above and other objects in view, the present invention consists in the improved form, construction and relative arrangement of the several parts as will be hereinafter more fully described, illustrated in the accompanying drawings, and subsequently incorporated in the subjoined claims.

In the accompanying drawings, in which similar reference characters designate corresponding parts throughout the several views:

Figure 1 is a sectional view through a part of a door having a latch applied thereto, and illustrating one embodiment of the present improvement.

Figure 2 is a sectional view taken on the line 2—2 of Figure 1.

Figure 3 is a view similar to Figure 1, showing another manner of applying or attaching the latch operating handle.

Figure 4 is a section taken on the line 4—4 of Figure 3.

Figure 5 is a view similar to Figure 1 showing the application of the invention to the door of a closed vehicle body.

Figure 6 is a fragmentary sectional view through the door of a touring car, and illustrating an alternative form of the device.

Figure 7 is a fragmentary sectional view showing a further modification.

Figure 8 is a detail section taken on the line 8—8 of Figure 1.

Figure 9 is a fragmentary section showing a still further alternative construction, and, Figure 10 is a section taken on the line 10—10 of Figure 9.

Referring in detail to the drawings, and more particularly to Figures 1 and 2 thereof, 5 designates a fragment of a door. In the illustrated embodiment of the invention I have shown a door such as is used upon motor vehicles having a rabbeted edge 6 to receive the flange 7 on a latch casing 8. This casing is set into a recess or mortise in the inner face of the door so that the inner side of the casing is flush with the door face. As the subject-matter of this application does not involve any specific latch mechanism, I have herein illustrated only the oscillating roll back 9 which constitutes the primary actuating element of the latch mechanism. As shown, this roll back at its opposite ends is formed with the diametrically reduced portions 10 having bearing engagement in openings provided in the opposite side plates of the casing 8. The roll back 9 is also formed with a rectangular longitudinally extending bore 11.

The door 5 is provided with a transverse passage 12 therethrough open at its opposite ends, and as shown in Figure 1 when the latch is applied, this passage is in coinciding axial alignment with the bore 11 of the roll back. To the outer face of the door 5 a metal plate or sheathing 13 is applied and secured. A bushing 14 is threaded into the outer end of the passage 12, and has an outwardly projecting annular flange 15 on its outer end bearing against the sheathing 13. This outer end of the bushing is further provided at diametrically opposite points with the notches or recesses 16 to receive the points of a suitable wrench, whereby the bushing may be readily inserted or removed.

The handle shaft 17 is provided with an intermediate rectangular portion 18 and an outer cylindrical portion 19 having the hand plate 20 at its extremity. This cylindrical porton 19 of the handle shaft is adapted to snugly fit within the bushing 14. At the inner end of the rectangular portion 18 the handle shaft is again reduced in diameter and formed with the longitudinally split expansible section 21, which is likewise of rectangular cross sectional form and is of slightly less dimensions than the bore 11 through the roll back, so that this split end of the handle shaft may be easily fitted within said bore. It will be noted that the split section 21 of the shaft is of slightly greater length than the roll back, and projects for a slight distance beyond the inner end of the latter. The reduced expansible section 21 provides a shoulder 22 at the end of the rectangular portion 18 of the shaft, and this shoulder is adapted for tight abutting contact against the outer end of the roll back.

The split end section 21 of the shaft is formed with a threaded bore and a tapering seating face with which the expanding screw 23 coacts.

For a more particular understanding of the operation of this expansible means, reference may be had to a second pending application, Serial No. 391,887, filed June 26, 1920, wherein such expansion means is fully illustrated and described. By threading the screw 23 inwardly the sections of the split end of the shaft are radially expanded and forced into tight binding engagement with the wall of the bore 11 at each of the corners thereof, as will be seen from reference to Figure 8 of the drawings. The split end of the shaft projects for about $\frac{1}{16}''$ beyond the end of the bore in the rollback, and when the shaft end is expanded, these split portions coacting with the end edges of the bore in the rollback tend to draw the shaft longitudinally and thereby tightly bind the shoulder 22 against the opposite end of the rollback. This action produces a very rigid connection between the handle shaft and the rollback. Accordingly it is apparent that the handle shaft is held in absolutely fixed relation to the roll back and against any possibility of turning movement with respect thereto. Likewise the shoulder 22 bearing tightly against the outer end of the roll back precludes any possibility of a lateral oscillation of the handle shaft with relation to the roll back.

Another advantage of this construction resides in the fact that the handle shaft may be tightly fixed in the roll back, regardless of inaccuracies in the thickness of the door. Also, in some cases the door as manufactured is provided with a latch receiving mortise of a depth slightly greater than that which is necessary. However, as the bushing 14 is not provided with a stop shoulder or flange, the enlarged end of the handle may be moved into said bushing for any distance necessary in order to tightly fit the shoulder 22 against the end of the roll back. The fact that the outer end of the shaft may project for an indefinite distance from the outer face of the door, is immaterial. The handle shaft may be made in such length that it can be readily applied to doors of different thicknesses, it being only necessary to know the length of the roll back 9, so that the split end portion of the handle shaft may be made of the proper length.

It will thus be seen that the present improvement provides an absolutely tight fit of the end of the handle and the roll back at all times, which cannot be loosened by either an inward or outward movement of the handle shaft.

It occurs with more or less frequency that the opening 12 through the door is not accurately bored by the manufacturer, and, therefore, since this opening could not be axially aligned with the bore of the roll back when the latch is subsequently applied to the door, it is apparent that the handle shaft could not be applied. In such cases, therefore, the bushing 14 is dispensed with, and after the latch is applied to the inner face of the door with the bore of the bushing opposed to the inner end of the passage 12' through the door, an escutcheon plate 26 is loosely engaged upon the outer cylindrical portion 19 of the handle shaft, and said shaft is then inserted through the passage 12' and its split reduced end portion engaged in the bore of the roll back and expanded into tight binding engagement therewith in the manner above described.

The escutcheon plate 26, which is freely movable on the handle shaft longitudinally thereof, is then brought into contact with the outer side of the door and secured by means of the screws indicated at 27. The opening in the escutcheon plate provides a snug rotating fit for the shaft portion 19, and the escutcheon plate is formed at the outer side of this opening with an annular rib 28 for ornamental effect.

In Figure 5 of the drawings I have illustrated a slightly modified form of the device as applied to the door of a closed vehicle body. In this construction the reduced longitudinally split expansible end portion 21' of the handle shaft is relatively long and the bearing portion 10' on the inner end of the roll back is also lengthened so that it will project slightly beyond the face of the latch casing. When the handle shaft is assembled in the roll back, as above explained, the expansible portion 21' thereof projects beyond the bearing 10', and upon this projecting end of the shaft an inner handle member 29 is loosely engaged, said member having a rectangular opening 30 through its enlarged end portion to receive the split end of the shaft. This end of the handle member is disposed in abutting contact with the projecting end of the bearing 10'. When the screw 23 is threaded home, the portions of the split end of the shaft are expanded so as to thereby tightly secure the main handle shaft and the inner handle member 29 to the roll back for oscillatory rotation as a unit therewith.

In Figure 6 I have shown another alternative form of the invention as applied to the door of the touring type of motor vehicle. The doors of such vehicle are relatively thin, since they are not provided with the glass panes or panels. It is also to be noted that in Figures 1, 3 and 5 of the drawings the roll back is positioned in one corner of the latch casing, and adjacent to its front edge. It is necessary to locate the roll back at this point since the door in this case is in the form of a frame in which the window pane or glass is held. In touring cars, however, a solid door structure is provided and, as indicated in Figure 6, in such cases the roll back may be located inwardly from the edge of the door and at the center of the latch casing. It will also be observed that in this instance the handle shaft 17' is relatively short, the intermediate rectangular section 18 being eliminated and the split section 21ª of the handle shaft extending from the end of the cylindrical section 19' thereof. The split section 21ª extends beyond the inner end of the roll back, and the inner handle member 29 is secured thereon by the expanding screw, as above explained, in connection with Figure 5 of the drawings.

In Figure 7 I have illustrated still another embodiment, wherein the handle shaft is provided at the juncture of its split end portion with the intermediate rectangular portion 18' thereof with a beveled shoulder 31 which seats against correspondingly beveled surfaces 32 at the outer end of the bore through the roll back 9. Thus it will be apparent that when the end of the handle shaft is expanded in the roll back, the surfaces of the beveled shoulder 31 will bind tightly against the corresponding opposed beveled faces 32, and thereby prevent the possible lateral displacement of the shaft with respect to the roll back.

In Figures 9 and 10 there is shown still another alternative construction, wherein the portion 18ª of the handle shaft is of cylindrical form, and the expansible end portion 21ᵇ of the handle shaft is likewise cylindrical and is longitudinally split to provide two separable sections. In this case the roll back 9 is provided with a cylindrical bore 11' and the normal diameter of the split end 21ᵇ of the handle shaft is of less diameter than this bore, so that it may be readily fitted therein. The split end of the shaft is expanded by means of the same expansion device shown in connection with the other figures of the drawing, so that the two sections thereof are forced into tight frictional binding engagement with diametrically opposite sides of the bore 11'.

From the foregoing description considered in connection with the accompanying drawings, the construction, manner of operation, and several advantages of the illustrated embodiments of the invention will be readily understood. In each case it will be evident that the handle shaft cannot be forced longitudinally in an inward direction through the bore of the roll back, since such movement is positively prevented by means of the shoulder 22. On the other hand the expanded end portion of the shaft coacting with the bore through the roll back prevents a movement of the shaft in the reverse or outward direction. Accordingly it is impossible for this operating handle to become loosened in the roll back, regardless of inaccuracies which may occur in the manufacture of the door.

I have herein referred to the device as being primarily designed for use in connection with the doors of motor vehicles, but it is apparent that the invention can also be advantageously employed in connection with refrigerator doors, safes, house doors, and for various other analogous purposes. In such alternative applications of the invention it may be found desirable or necessary to resort to certain mechanical alterations in the construction to which I have herein referred, and it is, therefore, to be understood that the device may be exemplified in numerous other structural forms other than those to which I have particularly referred. Accordingly, the privilege is reserved of adopting all such legitimate changes in the form, construction and relative arrangement of the several parts as may be fairly embodied within the spirit and scope of the invention as claimed.

I claim:

1. In combination with a door latch including an oscillatable actuating element having a longitudinal bore, an operating handle for said latch having a shaft, provided with a longitudinally split expansible terminal portion of a length slightly exceeding the length of the bore of said actuating element through which said terminal portion of the shaft is adapted to be disposed, and means for expanding said terminal portion of the handle shaft to rigidly secure the same in binding engagement with the walls of said bore and cause the portions of said terminal extending beyond one end of the bore to tightly bite or grip against the end edges of the bore.

2. In combination with a door having a transverse opening therethrough, a latch secured to said door and including an oscillatable actuating element having a bore opposed to one end of said opening, and an operating handle for said latch including a shaft adapted to be inserted through said opening in the door and provided with expansible means to be fitted within the bore of said actuating element, and a stop shoulder adapted to abut against one end of said element and position the expansible means for operative connection thereto.

3. In combination with a door having a transverse opening therethrough, a latch secured to said door and including an oscillatable actuating element having a bore opposed to one end of said opening, and an operating handle for said latch including a shaft adapted to be inserted through said opening in the door and provided with expansible means adapted to be fitted within the bore of said actuating element, said opening in the door being of such diameter relative to the bore in the actuating element as to admit of the insertion of the handle shaft through said opening and its connection to the actuating element when the opening is out of axial alignment with the bore in the actuating element, said handle shaft having a shoulder to abut against one end of said element and limit the movement of said shaft, and means fixed to the door and closing the other end of the opening therethrough.

4. In combination with a door having a transverse opening therethrough, a latch secured to said door, and including an oscillatable actuating element having a rectangular bore opposed to one end of said opening and an operating handle for said latch including a shaft adapted to be inserted through said opening in the door, and provided with expansible means to be fitted within the bore of said actuating element and project beyond one end thereof, said handle shaft having a shoulder to abut against the opposite end of said element and limit the movement of the shaft to position the expansible means for operative connection to the actuating element, and means fixed to the opposite side of the door surrounding said shaft and closing the other end of said opening.

5. In combination with a door having a transverse opening therethrough, a latch secured upon one side of said door and including an oscillatable actuating element, inner and outer operating handles for the latch, one of said handles extending through the opening in the door, and a common means for rigidly connecting said handles to the actuating element.

6. In combination with a door having a transverse opening therethrough, a latch secured upon one side of said door, and including an oscillatable actuating element having a bore opposed to one end of said opening, an outer operating handle having a shaft provided with connecting means on one of its ends, said shaft adapted for insertion through said opening to position the connecting means through the bore, in the actuating element, an inner handle member, and adjustable means to coact with said connecting means and simultaneously rigidly secure both the inner and outer handles to said actuating element.

7. In combination with a door having a transverse opening therethrough, a latch secured to one side of said door, and including a latch actuating element having a bore opposed to one end of said opening, an operating handle for the latch including a shaft adapted for insertion through the opening in the door and having expansible means to extend through the bore in said latch element, and project beyond the inner side of the door, an inner handle member adapted to be engaged upon the projecting end of said expansible means, and adjustable means to coact with the expansible means and simultaneously rigidly connect both the inner and outer handles to said actuating element.

8. In combination with a door having a transverse opening therethrough, a latch secured upon one side of said door and including an oscillatable actuating element having a rectangular bore opposed to one end of said opening, and an operating handle for said latch including a shaft adapted for insertion through said opening in the door and having expansible means to extend through the bore of the actuating element and a shoulder to abut against one end of said actuating element and limit the movement of said handle to its operative position, said expansible means projecting beyond the other end of the actuating element, an inner handle member adapted to be fitted upon the projected end of the expansible means, and means to coact with said expansible means and simultaneously rigidly connect both the inner and outer handles to the actuating element.

9. In combination with a door having a transverse opening therethrough, a latch secured upon one side of the door, and including a casing, a latch actuating element journaled in the opposite side walls of the casing for oscillatable rotation, said element having a rectangular bore opposed to one end of the opening through the door, a handle for the latch including a shaft adapted to be inserted through said opening, and having expansible means at one end to be fitted within the rectangular bore of the actuating element, said shaft being provided with a rectangular shoulder at the inner end of said expansible means to abut against one end of the actuating element, and adjustable means to coact with the expansible means on the shaft and rigidly bind the same against the walls of said bore.

10. In combination with a door having a transverse opening therethrough, a latch secured to one side of said door, and including an oscillating actuating element, a guide member secured to the outer side of the door, an operating handle for said latch having a shaft mounted in said guide member and supported thereby out of contact with the wall of said opening, said member permitting of the unobstructed longitudinal movement of the shaft through the opening in the door, said shaft having stop means to coact with the actuating element and limit such longitudinal movement of the shaft in one direction, and means for rigidly connecting the end of said shaft to the actuating element against rotative or longitudinal movement in either direction with respect thereto.

11. The combination with a door or like structure, of a latch comprising a casing secured to said door at one side thereof and having an oscillatable rollback, said rollback having one end exposed at said side of the door to which said latch is attached and concealed at the other side, said door being provided with a passage extending from said other side thereof to said concealed end of said rollback, said rollback having an opening extending axially therethrough, a handle shaft of smaller cross sectional area than said opening of said rollback inserted through said passage into the opening of said rollback and terminating in proximity to the exposed end of said rollback, the end of said shaft in said rollback being split longitudinally and provided with a passage extending through said end of the shaft axially thereof, and tapering means adapted to be engaged with the walls of said passage, the axis of said tapering means being coincident with the axis of said shaft, said tapering means adapted to expand said split end of the shaft transversely into tight engagement with the walls of said passage through the rollback.

12. The combination with a door or like structure, of a latch comprising a casing secured to said door at one side thereof and having an oscillatable rollback, said rollback having one end exposed at said side of the door to which said latch is attached and concealed at the other side, said door being provided with a passage extending from said other side thereof to the concealed end of said rollback, said rollback having an opening extending axially therethrough, a handle shaft of smaller cross sectional area than said opening of said rollback inserted through said passage into the opening of said rollback and terminating in proximity to the exposed end of said rollback, the end of said shaft in said rollback being split longitudinally and provided with a passage extending through said end of the shaft axially thereof, and tapering means adapted to be engaged with the walls of said passage, the axis of said tapering means being coincident with the axis of said shaft, said tapering means adapted to expand said split end of the shaft transversely into tight engagement with the walls of said opening through the rollback, a bushing at the end of said passage at the opposite side of the door, a handle on the corresponding end of the shaft having its bearing in said bushing, the transverse expansion of said shaft in said rollback adapted to prevent longitudinal variation of said shaft and permit longitudinal adjustment upon contraction of said shaft.

13. The combination with a door or like structure, of a latch comprising a casing secured to said door at one side thereof and having an oscillatable rollback, said rollback having one end exposed at said side of the door to which said latch is attached and concealed at its other end, said door being provided with a passage extending from the latter end of the rollback, said rollback having an opening extending axially therethrough, said opening being substantially square in cross section, a handle shaft inserted through said passage into the opening in said rollback, said handle shaft being substantially square in cross section and smaller in cross sectional area than the opening through said rollback, said shaft terminating in proximity to the exposed end of said rollback, the end of said shaft in said rollback being split longitudinally and in a plane extending through the axis of said shaft and also being split in a plane at right angles to said first split and extending through the axis of said shaft, said shaft being provided with a passage extending axially through the split portion thereof, and tapering means adapted to be engaged with the walls of said passage to expand said split end of the shaft transversely in four directions to tightly engage said split portions with the respective walls of said opening through the rollback.

14. The combination with a door or like structure, of a latch including a casing secured to said door at one side thereof and having an oscillatable rollback, said rollback having one end exposed at said side of the door to which the latch is attached and concealed at its other end, said door being provided with a passage extending from said latter end of the rollback, said rollback having an opening extending axially therethrough, said opening being substantially square in cross section, a handle shaft inserted through said passage into the opening in said rollback, said handle shaft being substantially square in cross section and smaller in cross sectional area than said opening through the rollback, said shaft terminating in proximity to the exposed end of the rollback, the end of said shaft in said rollback being split longitudinally and in a plane extending through the axis of said shaft and at right angles to the opposite side walls of said shaft and also being split in a plane at right angles to first split and at right angles to the other opposite side walls of said shaft and extending through the axis of said shaft, said split portion of the shaft being provided with a passage extending axially thereof, and tapering means adapted to be engaged with the walls of said passage and to expand said split end of the shaft transversely in four directions to tightly engage said split portions with the respective corners of said passage through the rollback.

15. In combination with a door latch including an oscillatable actuating element having a longitudinal bore, an operating handle for said latch having a shaft provided with a longitudinally split expansible terminal portion adapted to be engaged in the bore of said actuating element, said shaft having a shoulder at the inner end of its split terminal portion, and means for expanding said terminal portion of the shaft whereby the sections of said terminal portions are caused to coact with the actuating element to urge the same longitudinally and tightly engage the shoulder of said shaft with one end of the actuating element and to frictionally engage the walls of said bore and thereby rigidly connect the split terminal of the shaft to the actuating element.

16. In combination with a part having a continuous uninterrupted bore open at its opposite ends, a shaft provided with a longitudinally split expansible terminal portion of a length exceeding the length of the bore of said part through which said terminal portion of the shaft is adapted to be disposed, and means for expanding said terminal portion of the shaft to rigidly secure the same in binding engagement with the walls of said bore and cause the portions of said shaft terminal extending beyond one end of the bore to tightly bite or grip against the end edges of said bore.

In testimony that I claim the foregoing as my invention, I have signed my name.

LEON OTTINGER.